(12) United States Patent
Kirovski

(10) Patent No.: US 8,190,547 B2
(45) Date of Patent: May 29, 2012

(54) SEMI-EXACT ALGORITHMS FOR OPTIMIZATION

(75) Inventor: Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 12/146,619

(22) Filed: Jun. 26, 2008

(65) Prior Publication Data

US 2009/0327177 A1 Dec. 31, 2009

(51) Int. Cl.
*G06F 17/00* (2006.01)
*G06N 5/02* (2006.01)

(52) U.S. Cl. ........................................................ 706/46

(58) Field of Classification Search .................... 706/46, 706/62

See application file for complete search history.

(56) References Cited

U.S. PATENT DOCUMENTS

| | | | |
|---|---|---|---|
| 5,636,328 A | 6/1997 | Kautz et al. | |
| 6,085,216 A | 7/2000 | Huberman et al. | |
| 6,272,483 B1 * | 8/2001 | Joslin et al. | 706/62 |
| 6,418,510 B1 * | 7/2002 | Lamberts | 711/113 |
| 6,704,692 B1 * | 3/2004 | Banerjee et al. | 702/189 |
| 6,912,515 B2 | 6/2005 | Jackson et al. | |
| 7,036,720 B2 | 5/2006 | Mezard et al. | |
| 7,187,672 B1 | 3/2007 | Vishnu | |
| 7,266,790 B2 | 9/2007 | Pandey et al. | |

FOREIGN PATENT DOCUMENTS

WO 2007089674 A2 8/2007

OTHER PUBLICATIONS

Kirovski, et al., "Efficient Coloring of a Large Spectrum of Graphs", retrieved at<<http://citeseer.ist.psu.edu/cache/papers/cs/6737/http:zSzzSzwww.cs.ucla.eduzSz~darkozSzpaperszSzdac98_gc.pdf/kirovski98efficient.pdf>>, Jun. 1998 San Francisco, CA, USA, pp. 1-6.

Gelatt, et al., "Optimization by Simulated Annealing", retrieved at<<http://fezzik.ucd.ie/msc/cscs/ga/kirkpatrick83optimization.pdf>>, May 13, 1983, pp. 10.

Glover Fred, "Tabu Search—Part I", retrieved at<<http://leeds-faculty.colorado.edu/glover/TS%20-%20Part%20I-ORSA.pdf>>, ORSA Journal on Computmg, vol. I, No. 3, Summer 1989, Feb. 1989, pp. 17.

Sudan, et al., "Free bits, PCPs and non-approximability—towards tight results", retrieved at<<http://citeseer.ist.psu.edu/cache/papers/cs/32216/http:zSzzSzwww.uni-paderborn.dezSzfachbereichzSzAGzSzagmadhzSzScriptszSzGENERALzSzInteractivezSzBellare-Goldreich-Sudan.pdf/bellare95free.pdf>>, Dec. 31, 1995, pp. 130.

Coudert Olivier, "Exact coloring of real-life graphs is easy", retrieved at<<http://citeseer.ist.psu.edu/cache/papers/cs/17882/http:zSzSzherkules.informatik.tu-chemnitz.dezSzproceedingszSzdac-97zSzpaperszSz1997zSzdac97zSzhtmfileszSzsun_sgizSz..zSz..zSzpdffileszSz06_4.pdf/coudert97exact.pdf>>, pp. 1-6, 1997.

(Continued)

*Primary Examiner* — Jeffrey A Gaffin
*Assistant Examiner* — Benjamin Buss

(57) ABSTRACT

Described herein is a meta-algorithm adaptable to different types of optimization problems and different computing platforms. A problem space is (i) browsed using a heuristic that computes objectives locally and (ii) while constructing a solution, key decisions are performed globally. A simple data structure—a probabilistic cache—is used to efficiently store intermediate sub-solutions. As an example, the meta-algorithm is applied to find an algorithm for solving the graph coloring problem.

15 Claims, 4 Drawing Sheets

150

```
color(𝒢ᵢ, iteration t)
  if S = a(𝒢ᵢ) does not finish in T₁ seconds
    then run S = S ∪ b(𝒢ᵢ) for T₂ seconds
  sort MISes in S in descending order of g_F
  compute overlap matrix H:
    (∀i, j ∈ S)H(i, j) = {1|i ∩ j ≠ ∅, 0|else}
  M = greedy_find_MIS(H)
  compute MIS collections 𝔻ᵢ = 𝒜₂(H, M)
  flag(𝒢ᵢ) = 1
  wait until ∀𝒢ₓ colored at iteration t, flag(𝒢ₓ) = 1
  F = ∅
  for each 𝒢ₓ colored at iteration t
    for each MIS collection d ∈ 𝔻ₓ
      compute objective function of = g_S(𝒢ₓ − d)
      if |F| < L then F = F ∪ {𝒢ₓ, d, of}
      else if of < max{∪_∀{𝒢_y, d_y, ∘f_y}∈F of_y}
        replace the element in F with the largest
        objective function with {𝒢ₓ, d, of}
  for each {𝒢ₓ, dₓ, ofₓ} ∈ F
    if |Eₓ| < ϑ then exact_color(𝒢ₓ − dₓ)
    else color(𝒢ₓ − dₓ, t+1)
```

OTHER PUBLICATIONS

Brelaz Daniel, "New methods to color the vertices of a graph", retrieved at<<http://delivery.acm.org/10.1145/360000/359101/p251-brelaz.pdf?key1=359101&key2=8527722021&coll=GUIDE&dl=GUIDE&CFID=15186686&CFTOKEN=45286187>>, Communications of the ACM, vol. 22, No. 4, Apr. 1979, pp. 251-256.

Peemoller Jurgen, "A correction to Brelaz's modification of Brown's coloring algorithm", retrieved at<<http://delivery.acm.org/10.1145/360000/358171/p595-peemoller.pdf?key1=35817&key2=8537722021&coll=GUIDE&dl=GUIDE,ACM&CFID=15186891&CFTOKEN=29050188>>, Aug. 1983, vol. 26, No. 8, pp. 595-597.

Juels, et al. ,"Hidden cliques as cryptographic keys", retrieved at<<http://digitalassets.lib.berkeley.edu/techreports/ucb/text/CSD-96-912.pdf>>, Aug. 22, 1996, pp. 1-8.

Johnson, et al. ,"Optimization by simulated annealing: an experimental Evaluation", retrieved at<<http://www.cs.uic.edu/~jlillis/courses/cs594_f02/JohnsonSA.pdf>>, Operations Research vol. 39, No. 3, May-Jun. 1991, pp. 378-406.

Galinier, et al. ,"Hybrid evolutionary algorithms for graph coloring", retrieved at<<http://www.info.univ-angers.fr/pub/hao/papers/JOC099.pdf>>, Journal of Combinatorial Optimization 3, 379-397 (1999), Jun. 2, 1999, pp. 1-19.

Boppana, et al. ,"Approximating maximum independent sets by excluding subgraphs", retrieved at<<http://citeseer.ist.psu.edu/cache/papers/cs/26318/http:zSzzSzwww.cs.umd.eduzSz~gasarchzSzramseyzSzindset.pdf/boppana92approximating.pdf>>, BIT 32, 2, Jun. 1992, pp. 1-13.

Hastad Johan, "Clique is hard to approximate within n1-E ", retrieved at<<http://citeseer.ist.psu.edu/cache/papers/cs/25800/http:zSzzSzwww.nada.kth.sezSz~johanhzSzcliqueinap.pdf/hastad02clique.pdf>>, Feb. 18, 2002, pp. 1-43.

* cited by examiner

150

--- color($\mathcal{G}_i$, iteration $t$)
if $\mathbb{S} = a(\mathcal{G}_i)$ does not finish in $T_1$ seconds
then run $\mathbb{S} = \mathbb{S} \cup b(\mathcal{G}_i)$ for $T_2$ seconds
sort MISes in $\mathbb{S}$ in descending order of $g_F$
compute overlap matrix $\mathbb{H}$:
   $(\forall i, j \in \mathbb{S}) H(i,j) = \{1 | i \cap j \neq \emptyset, 0 | \text{else}\}$
$M = \text{greedy\_find\_MIS}(\mathbb{H})$
compute MIS collections $\mathbb{D}_i = \mathcal{A}_2(\mathbb{H}, M)$
flag($\mathcal{G}_i$) = 1
wait until $\forall \mathcal{G}_x$ colored at iteration $t$, flag($\mathcal{G}_x$) = 1

---

$\mathbb{F} = \emptyset$
for each $\mathcal{G}_x$ colored at iteration $t$
  for each MIS collection $d \in \mathbb{D}_x$
    compute objective function $of = g_S(\mathcal{G}_x - d)$
    if $|\mathbb{F}| < L$ then $\mathbb{F} = \mathbb{F} \cup \{\mathcal{G}_x, d, of\}$
    else if $of < \max\{\cup_{\forall \{\mathcal{G}_y, d_y, of_y\} \in \mathbb{F}} of_y\}$
      replace the element in $\mathbb{F}$ with the largest
      objective function with $\{\mathcal{G}_x, d, of\}$
for each $\{\mathcal{G}_x, d_x, of_x\} \in \mathbb{F}$
  if $|E_x| < \vartheta$ then exact\_color($\mathcal{G}_x - d_x$)
  else color($\mathcal{G}_x - d_x$, t+1)

SEMI-EXACT ALGORITHMS FOR OPTIMIZATION

BACKGROUND

Optimization is an increasingly important area of computing. Problems like mutual resource constraints, software development, business decisions, electronic design automation (e.g., automated chip layout), and many other real world applications have been solved with optimization algorithms implemented by computers. While, optimization technology has advanced slowly and in small increments, even some small gains in performance can be of significant benefit. Described below are techniques for designing optimization algorithms than can be applied to all optimization problems.

SUMMARY

The following summary is included only to introduce some concepts discussed in the Detailed Description below. This summary is not comprehensive and is not intended to delineate the scope of the claimed subject matter, which is set forth by the claims presented at the end.

Described below is a meta-algorithm adaptable to different types of optimization problems and different computing platforms. A problem space is (i) browsed using a heuristic or function that quickly computes objectives locally and (ii) while constructing a solution, expensive key decisions are performed globally with a global cost function. A data structure—a probabilistic cache—is used to efficiently store intermediate sub-solutions. As an example, the meta-algorithm is applied to find an algorithm for solving the graph coloring problem.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 3 shows pseudocode for a semi-exact graph developed using the meta-algorithm.

DETAILED DESCRIPTION

Introduction

Figure 1:
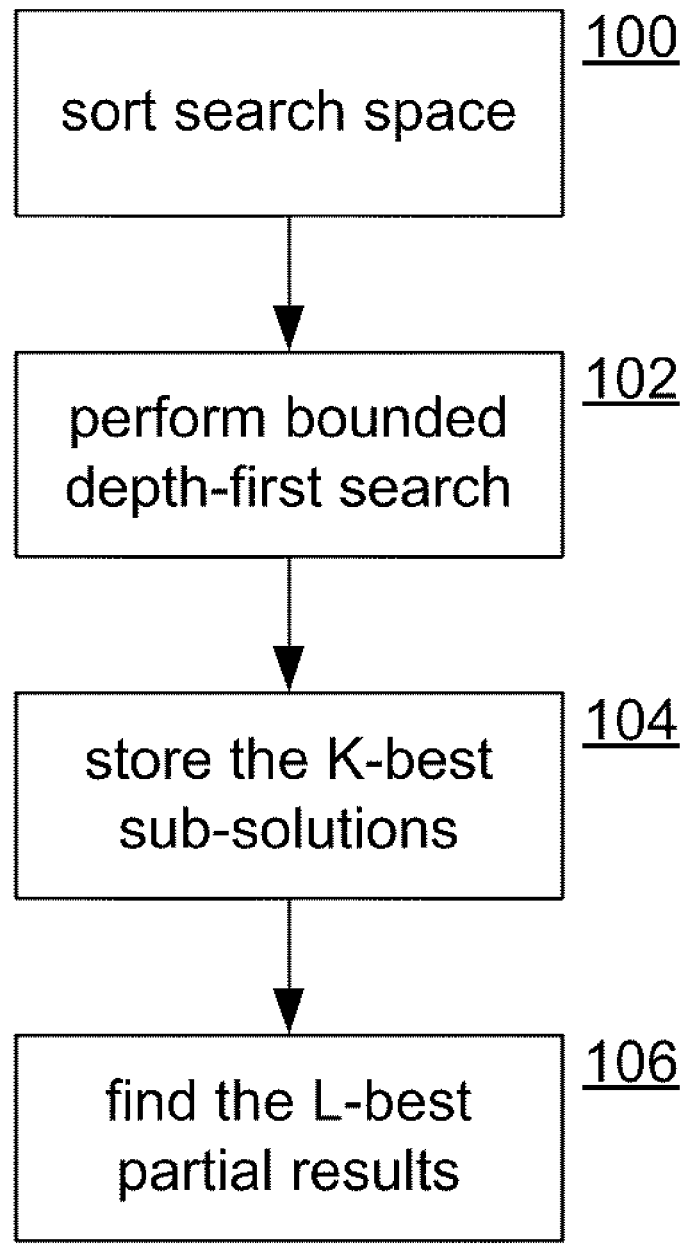
FIG. 1 shows a flowchart for a meta-algorithm.

Described herein is an automated paradigm for designing algorithms for solving hard combinatorial problems. The paradigm integrates several design strategies that can be adjusted to many well-defined problems, computing platforms, and performance requirements. As will be described, notable features include: (i) a problem space is browsed using a heuristic that computes objectives locally and (ii) while constructing a solution, key decisions are performed globally. The paradigm or meta-algorithm uses a probabilistic cache; a data structure that efficiently maintains a pool of intermediate candidate sub-solutions. As an example application of the meta-algorithm, an algorithm for graph coloring is designed. The result is a nearly deterministic well-performing graph coloring algorithm.

While optimization meta-algorithms exist (e.g., genetic algorithms, simulated annealing, etc.) these techniques do not fully leverage powerful computing platforms now emerging. Existing meta-algorithms inefficiently analyze problem spaces in a mechanical methodical manner, over-relying on randomness and the localized nature of their decision making.

The meta-algorithm described herein can be readily adjusted to most NP-hard problems and can be run on computing platforms such as multi-core and grid computers. Key aspects of the meta-algorithm include a (i) fast search process and (ii) a slow decision making process.

The fast search aspect involves browsing a problem space using an algorithm that quickly generates one intermediate sub-solution from another. This algorithm is accompanied with an objective function for quantifying the desirability of each sub-solution by analyzing its locality. This results in a fast generation and evaluation of intermediate candidate sub-solutions, e.g., color classes/maximal independent sets in graph coloring.

To store results of the fast search, a simple, fast-access data structure—a probabilistic cache—is provided to maintain a relatively large pool of high quality intermediate sub-solutions identified by the fast search. Consider the following general properties of this data structure and how it is used in the meta-algorithm. During the slow decision process, when sub-solutions in the probabilistic cache are examined for actual selection in the final solution, key decisions are made based upon global, computationally expensive heuristics (slow). In the example of graph coloring, this would involve coloring a selected maximal independent set. The sub-solutions are analyzed in a bounded depth first manner, which creates a large number of leaf-solutions in the overall search-tree with only the best one(s) reported as algorithm output.

In the description below, aspects of the meta-algorithm will be illustrated by constructing a graph coloring algorithm.

Graph Coloring

Before describing the meta-algorithm, consider the following explanation of the graph-coloring problem using the Garey-Johnson format. Given Gragh G(V,E), and positive integer K<=V, the problem is does there exist a function f:V→1, 2, 3, . . . K such that f(u)≠f(v) whenever u,v∈E? The problem is further formulated by defining the chromatic number of graph G to be the smallest number of colors X(G) needed to color the vertices of G so that no two adjacent vertices share the same color. An approximation for the NP-complete problem produces a number of colors no more than:

$$O\left[\frac{|V|\cdot(\log\log|V|)^2}{\log^3|V|}\right]\cdot x^{(G)}. \tag{1}$$

Meta-Algorithm for Designing Algorithms

An outline of the meta-algorithm is now presented, followed by a demonstration of its application to graph coloring. Using the meta-algorithm it may be possible to obtain an algorithm that, although technically a heuristic, in practice nearly has the determinism of an exact algorithm. A property of exact algorithms is that they are capable of finding solutions that globally satisfy the optimization constraint through exhaustive enumeration. Since this approach is prohibitive for instances with large cardinalities, the following steps may be used.

FIG. 1 shows a flowchart for a meta-algorithm. First, the search space, S, is sorted 100. The sorting 100 is preformed according to a computationally inexpensive yet efficient objective function $g_F$. The goal for this function is to quantify the qualitative appeal of a specific sub-solution as a component of the final solution. By having a computationally inexpensive $g_F$, one can evaluate a large number of sub-solutions. The trade-off is that a fast $g_F$ typically is inaccurate in its quantification. The proposed algorithm deals with this inaccuracy efficiently in the subsequent steps. Next, a bounded depth-first search 102 is performed over S to find high-quality intermediate sub-solutions. The K best sub-solutions are then stored 106 in a storage D while conducting the search, where K is relatively large. Finally, The L-best partial results are found 108 using sub-solutions from D, where result quality is measured using a computationally expensive objective function $g_S$ (proportionally to $g_F$), which aims to quantify how easy it is to solve the remainder of a particular problem instance. For each sub-solution instance remaining in D that corresponds to a specific partial result, the sorting 100, search 102, storing 104, and finding 108 are again performed.

The meta-algorithm creates a narrow tree of high-quality partial results while it seeks a final solution in an iterative manner. Each iteration aims at solving a large part of the remainder of the corresponding problem instance. This approach helps ensure that decisions, while searching for a final solution, are made based upon global metrics, not heuristics that take into account constraints within a specific locality of the problem instance.

Searching Space S for Graph Coloring

The meta-algorithm, as applied to graph coloring, will now be described. To discuss how this meta-algorithm applies to graph coloring, an RLF-style approach is adapted for coloring graphs. Note that one color class, i.e., nodes colored with the same color in the final solution, could be a maximal independent set (MIS). Given the Graph G(V, E), and positive integer $K \leq |V|$, the problem is does G have an independent set of size at least K, i.e., a subset W of at least K nodes from V such that no pairs of nodes in W is joined by an edge in E?

While this problem is NP-complete, finding an independent set of maximum cardinality is NP-hard. An independent set $W \subset V$ is denoted such that for each node $v \in V-W$ there exists a node $w \in W$ such that $(v, w) \in E$, a maximal independent set. The INDEPENDENT SET has a dual problem of finding a maximum clique in a complementary graph. Thus, finding independent sets for both dense and sparse graphs can be computed using dual heuristics over sparse graphs. It can be concluded that the maximum memory requirement is exhibited for graphs with edge probability p=0.5. Finding a maximum clique in a graph is approximable within $O(|V|=\log^2(|V|))$ and not approximable within $|V|^{1/2-\epsilon}$ for any $\epsilon>0$.

Set $S_{NP}$ is defined as a set of all independent sets over G. Since this space could be of prohibitively large cardinality, the search space is defined as $S \subset S_{NP}$ as a set of independent sets over G that has been identified using a single run of a specific polynomial algorithm $A_1$. The graph coloring algorithm described herein will find a cardinality-M subset of non-overlapping MISes from S that optimizes a specific global objective function and color them at once using M colors.

Before proceeding, consider the definition of a neighbor function h, where over a node $v \in V$ is defined as h: $v \rightarrow W$, $W \subset V$ such that for each node $w \in W$, $(v,w) \in E$. Consider also a definition of degree function d: $v \rightarrow Z^*$ returns $d(v) \equiv |h(v)|$.

First, one of the proposed two algorithms is provided for establishing S: (a) an exact one, $S=S_{NP}$, and (b) a probabilistic algorithm $A_1$ that starts from a random MIS $W_1$, then creates $W_2$ by setting $W_2=W_1$, next, it randomly excludes certain percentage of nodes from $W_2$, then randomly includes nodes from $V-W_2-\cup_{\forall v \in w_2} h(v)$ into $W_2$ until it becomes a MIS. $A_1$ repeats this process a fixed number of iterations and excludes all duplicates from the resulting S. When possible, choice (a) is opted for. It is possible to generate all MISes for G(500, 0.5) within several hours on a 3.2 MHz Pentium processor using the algorithm (a).

Next, S is sorted using an objective function $g_F$ whose goal is to quantify how beneficial it is to include a specific MIS, W, into the final coloring. It is desirable that $g_F$ increases for MISes of large cardinality and MISes whose nodes have neighbors with high degrees. Nodes with high degrees are colored first. The degree of nodes with many neighbors is decreased (i.e., the most constrained nodes) in the remaining uncolored subgraph. Objective function $g_F$ may be:

$$g_F(W) = \sum_{\forall w \in W}\left[d(w)^{\alpha_1} \sum_{\forall u \in h(w)} d(u)^{\alpha_2}\right], \quad (2)$$

where constants $\alpha 1$ and $\alpha 2$ are determined experimentally and can vary for different types of graphs. Note that the objective function $g_F$ is particularly tailored for both algorithms that generate MISes, as iterative MIS creation does not need recomputation of the objective function, only an update. This makes it possible to generate and evaluate as many MISes in G as possible. Once S is sorted, only the top 3 MISes are kept in S, and the next step is performed. Note that Parameter $\alpha 3$ is a user supplied constant.

Bounded Depth-First Search

In this step, we want to identify a fixed-cardinality collection of non-overlapping MISes from S which can be used to color a subset of the input graph instance G so that the remaining subgraph can be colored using as few as possible colors. Since verifying the true optimization objective involves a computationally expensive check, the problem is defined using a simple and fast heuristic. It is desirable to find an M-tuple $x \in S$ of non-overlapping MISes such that:

$$x = \arg\max_{\forall x_M \in S}\left[\sum_{\forall W \in x_M} g_F(W)\right], \quad (3)$$

where $\forall x_M \in S$ denotes all non-overlapping M-tuples of MISes from S. In addition, since the objective is established only heuristically, it is preferable to find K M-tuples with the highest $\Sigma g_F$.

The developed algorithm, $A_2$, performs the following steps. First, in $O(\alpha_3^2)$ the overlap matrix for all MISes in S is computed. Next, based on S a greedy test is established based on how many MISes, M, from S could be colored at once in the partial solution, i.e., coloring of a subgraph in G. Note that for a given S, finding the maximum M is NP-hard, i.e., it is equivalent to finding a maximum independent set in a graph whose each node corresponds to an MIS from S and whose each edge is drawn between two nodes whose corresponding MISes in S intersect. M is established using a greedy algorithm which first selects the MIS with the highest $g_F$, and then iteratively selects the first highest ranked MIS which does not intersect with the selected MISes.

With a known M, a recursive bounded depth-first search is performed over S for a non-overlapping tuple of M MISes. At each depth in the ranks of S, the recursion is performed only with the highest-ranked $\alpha 4$ non-overlapping MISes. The appeal of coloring a specific M-tuple $x_M$ of MISes is judged based upon Equation 3. During the search process, a storage D of K best M-tuples of MISes is maintained using a probabilistic cache described in the next section. For relatively large M, the search could be prohibitively expensive. To reduce complexity, depth-searching is enabled in chunks of α5 MISes so that the best k·α5-tuples (k=1, 2, . . . ) of MISes are stored in an intermediate storage; then, for each tuple of MISes in this storage, searching for (k+1)·α5-tuples of MISes is continued until M-long tuples are reached. The size of the intermediate storage, α6, is typically significantly smaller than α7=|D|. Although parameters α4, . . . , α7 could be estimated based upon desired algorithm run-times, in this implementation they are user-supplied constants.

Storing the K-Best Sub-Solutions

A probabilistic cache R is provided as a cache structure with K entries of <payload,cost>, where a store <p,c> operation is performed by randomly selecting r entries from R, finding the selected entry <q,d> with the lowest cost, and if c>d, replacing <q,d> with <p,c>. If there are empty entries in the cache, they are filled first. Parameter r<<<K determines the complexity of storing data in this structure, O(r), which is invariant of the cache size.

Figure 2:
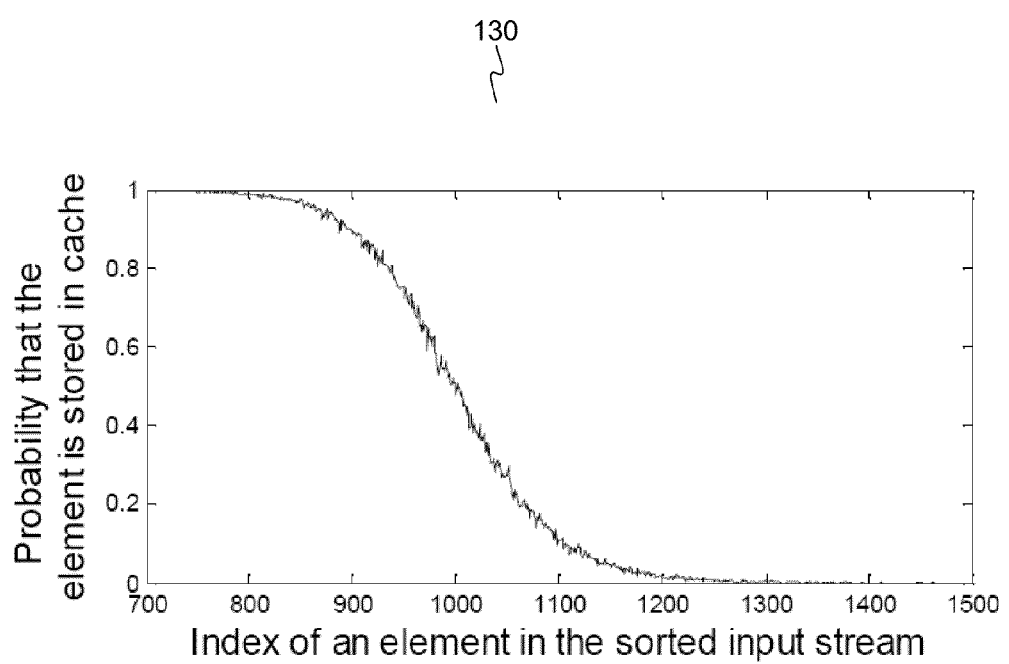
FIG. 2 shows probabilities of cache retention for a probabilistic cache.

Probabilistic caches enable creation of a large storage area with fast access that can be used in both storing MISes during $A_1$ and storing MIS collections in $A_2$. Experiments have confirmed their efficiency. FIG. 2 shows results of an experiment where an input stream of 106 pseudo-random numbers was generated and fed to a probabilistic cache of size K=1000 and access rate r=20 with the intention of recording the largest K numbers from the stream. As seen in FIG. 2, the probability that an entry among the largest 1500 numbers (abscissa quantifies numbers' indices in the sorted stream) is retained in the cache. Probabilities were estimated using 1000 different runs of the same experiment. It can be concluded that by increasing K by 25% (from 800 to 1000), one can actually retain nearly all of the top 800 entries at significant improvement in access performance.

Finding L-Best Partial Results

Given a storage D of K candidate MIS M-tuples optimized with respect to Equation (3), the goal is to select a small sub-set of L tuples and create L different partial colorings. The optimization objective is: the remaining subgraphs should be colorable with as few colors as possible. For a subgraph $Gr(Vr;Er) \frac{1}{2} G(V;E)$, we designed an objective function $g_S: G_r \rightarrow Z^*$:

$$g_S(G_r(V_r, E_r)) = \sum_{\forall u \in V_r} \left[ d(u)^{\alpha_8} \sum_{\forall w \in h(u)} d(w)^{\alpha_9} \right] \quad (4)$$

where function h(u) returns neighbors of u in $V_r$ only and constants α8 and α9 are determined experimentally and could change for different types of graphs.

Computing $g_S(G_r(V_r, E_r))$ may require $O(|V|^3)$ operations for graphs where average node degree is proportional to |V|, hence, it is a rather slow heuristic. With the present algorithm, $g_S$ is run over each of the K partial solutions memorized in D to select the L best. The pool of L intermediate solutions is then processed by feeding the remainder subgraphs back as input to the algorithm. This initiates a tree-like search for the best solution, where at each iteration the number of partial solutions of sufficient cardinality for desired run-times is limited. The leaves of the search process are colored using an exact coloring algorithm based upon recursive exhaustive enumeration of the search space. A (set of) solution(s) with a minimal number of colors used to color G is returned as output.

FIG. 3 shows pseudocode 150 for the developed semi-exact graph coloring algorithm "color( )". Threshold θ determines whether a graph of certain cardinality is going to be colored using an exact coloring algorithm or using another iteration of color( ).

Discussion

The developed meta-algorithm may exhibit two features that are contrary to common algorithm design methodologies. First, in the version of the algorithm where MISes are generated via exhaustive enumeration, (a), apart from storing intermediate results using the probabilistic cache, all other actions are done deterministically. This lack of randomness in browsing the search space is in opposition to simulated annealing, tabu search, genetic search, and other randomized search strategies. While one would anticipate that the algorithm would not be capable of finding solid results, it has been shown that by sorting the search space and browsing the important part exhaustively, one could reach on-par if not better results than competing probabilistic methodologies. In addition, methodic semi-exact parsing of the search space improves confidence in the quality of the solution reached by the algorithm. With instances which are not part of well-known benchmarks, i.e., with unknown cardinalities of the optimal solution, having such confidence improves the cost of optimization as designers can be confident when they reach a specific optimized design.

Second, the meta-algorithm is focused on reducing the number of local optimizations that impact actions that construct the final coloring. In fact, (near-)optimal local features of sub-solutions may be used only to identify a set of candidates for construction. Then, each candidate is evaluated using a global feature-set. The reasoning behind this strategy is that solid solutions rarely exhibit locally optimized features—typically, if this is the case, finding solid solutions for such instances is easy.

Finally, the developed algorithm may be readily implemented for distributed computing systems as most components of the algorithm can be executed in a modular and isolated fashion.

CONCLUSION

Figure 4:
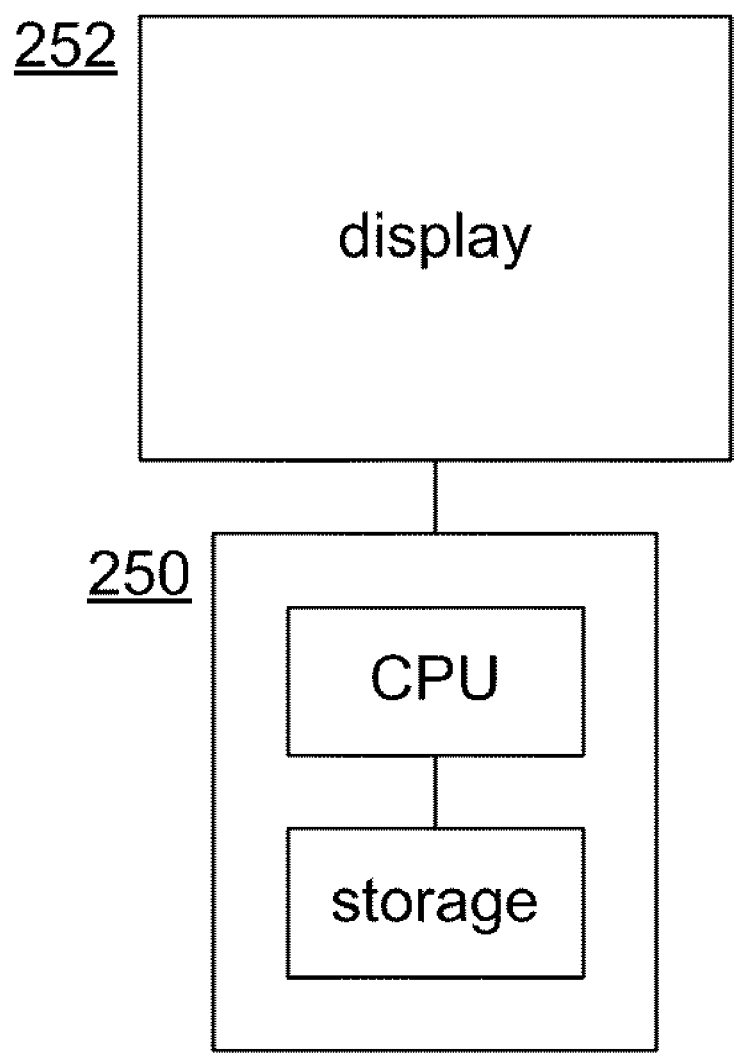
FIG. 4 shows a computing device.

The meta-algorithm described above may be implemented on one or more computing devices such as shown in FIG. 4. A computing device 250 may have a CPU and storage and may provide video output to a display 252. The computing device 250 may communicate via a network. Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method of exploring a search space of potential solutions to an optimization problem, the method performed by a computing device comprising at least a processor, memory, and a storage, the method comprising:

sorting, by the processor, the search space according to a first object function, the first objective function being more computationally expensive and more computationally efficient than a second objective function;

performing, by the processor, a bounded depth-first search over the search space to find intermediate sub-solutions to the problem using the first object function;

storing, by the processor, K best sub-solutions in the storage while performing the depth-first search, and storing intermediate sub-solutions from the storage in a probabilistic cache, wherein the probabilistic cache stores the sub-solutions in the form of entries, each entry comprising indicia of a sub-solution and an associated cost, and wherein a new entry in the probabilistic cache is stored by randomly selecting a subset of entries in the probabilistic cache and replacing an entry in the subset with the new entry by comparing a cost of the new entry with the costs of the entries in the subset;

finding L best partial results using sub-solutions from the storage, where result quality that would be provided by a sub-solution is measured using the second objective function; and storing at least a subset of the L best partial results in the memory of a of the computing device, wherein the subset of the L best partial results is then used as the search space and the sorting, performing, storing, and finding are performed accordingly to produce final solutions to the optimization problem.

2. A computer-implemented method according to claim 1, wherein sub-solutions to the optimization problem are identified and initially eliminated from the search space.

3. A computer-implemented method according to claim 1, wherein, apart from storing intermediate results in a probabilistic cache, the method is performed without randomness.

4. A computer-implemented method for implementing a meta-algorithm for automatically designing an algorithm for finding a solution to an optimization minimization or maximization problem, the method comprising:

a sorting step sorting a search space, the search space comprising a space of possible solutions;

a depth-first search step performing a depth-first search of the search space;

a storing step for storing K best sub-solutions while performing the depth-first search step, storing intermediate sub-solutions in a cache that probabilistically caches sub-solutions, wherein a new sub-solution is added to the cache by randomly selecting subsample of sub-solutions in the cache and replacing a sub-solution thereof, wherein the number of sub-solution in the subset is smaller than the number of sub-solutions in the cache;

a finding step finding L best partial results among the stored K best sub-solutions, from among which a final solution is outputted; and storing the L best partial results in memory of a computing device and at least a subset of the stored L best partial results comprise the outputted final solution.

5. A computer-implemented method according to claim 4, wherein a narrow tree of high-quality sub-solutions is created while iteratively performing the steps to find a final solution.

6. A computer-implemented method according to claim 4, wherein the sorting is performed using an arbitrarily chosen objective function which computes a cost of a sub-solution and the sorting is based on the costs of the sub-solutions as computed by the objective function.

7. A computer-implemented method according to claim 6, wherein the sorting step is performed iteratively for different combinations of sub-solutions while minimizing or maximizing the objective function on the different combinations.

8. A computer-implemented method according to claim 4, wherein the method is deterministic and not random, except for random selection of intermediate sub-results in a probabilistic cache.

9. A computer-implemented method for searching a problem space search-tree, the method comprising:

iteratively performing a fast search browse of the problem space using an algorithm that generates one intermediate sub-solution for the problem from another intermediate sub-solution for the problem, where the algorithm uses an objective function that quantifies desirability of the intermediate solutions by analyzing its locality in the problem space;

providing a fast-access probabilistic cache to maintain a pool of the intermediate sub-solutions identified by the fast searching, wherein a new intermediate sub-solution is added to the probabilistic cache by selecting a subset of intermediate sub-solutions in the probabilistic cache and determining if a cost of the new intermediate sub-solution is greater or less than costs of the intermediate sub-solutions in the subset, and wherein the subset is selected from the probabilistic cache, and wherein the size of the subset is smaller than the size of the probabilistic cache;

examining intermediate sub-solutions in the probabilistic cache for selection into a set of final solutions to the problem where a determination of whether to include an intermediate sub-solution in the final set is based on a global heuristic; and storing the set of final solutions in a memory of a computing device.

10. A computer-implemented method according to claim 9, further comprising analyzing the intermediate sub-solutions in a bounded depth-first manner to create leaf-solutions of the problem space search-tree.

11. A computer-implemented method according to claim 9, wherein the algorithm used for the fast searching is faster, computationally, than the global heuristic.

12. A computer-implemented method according to claim 9, wherein a new intermediate sub-solution is added to the probabilistic cache by selecting a subset of intermediate sub-solutions in the probabilistic cache and determining if a cost of the new intermediate sub-solution is greater or less than costs of the intermediate sub-solutions in the subset.

13. A computer-implemented method according to claim 12, wherein the subset is randomly selected from the probabilistic cache, and wherein the size of the subset is smaller than the size of the probabilistic cache.

14. A computer-implemented method according to claim 9, wherein the method is configured to be performed for arbitrary types of optimization problems.

15. A computer-implemented method according to claim 9, wherein the fast searching is performed without random selection.

* * * * *